(12) United States Patent
Park et al.

(10) Patent No.: US 11,955,625 B2
(45) Date of Patent: Apr. 9, 2024

(54) COMPOSITE NEGATIVE ELECTRODE ACTIVE MATERIAL, METHOD OF PRODUCING THE SAME, AND NEGATIVE ELECTRODE AND LITHIUM SECONDARY BATTERY INCLUDING THE SAME

(71) Applicants: SK On Co., Ltd., Seoul (KR); UNIST (Ulsan National Institute of Science and Technology), Ulsan (KR)

(72) Inventors: Eunjun Park, Daejeon (KR); Joon-Sup Kim, Daejeon (KR); Jaekyung Sung, Ulsan (KR); Yoon Kwang Lee, Ulsan (KR); Tae Yong Lee, Ulsan (KR); Jae Phil Cho, Ulsan (KR)

(73) Assignees: SK On Co., Ltd., Seoul (KR); UNIST (Ulsan National Institute of Science and Technology), Ulsan (KR)

( * ) Notice: Subject to any disclaimer, the term of this patent is extended or adjusted under 35 U.S.C. 154(b) by 188 days.

(21) Appl. No.: 17/407,366

(22) Filed: Aug. 20, 2021

(65) Prior Publication Data
US 2022/0059821 A1    Feb. 24, 2022

(30) Foreign Application Priority Data

Aug. 21, 2020 (KR) .................. 10-2020-0105117

(51) Int. Cl.
| | |
|---|---|
| H01M 4/36 | (2006.01) |
| H01M 4/02 | (2006.01) |
| H01M 4/58 | (2010.01) |
| H01M 4/62 | (2006.01) |
| H01M 10/0525 | (2010.01) |

(52) U.S. Cl.
CPC ............ *H01M 4/364* (2013.01); *H01M 4/58* (2013.01); *H01M 4/625* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2012/0156424 A1*  6/2012  Chen ............... B82Y 30/00
                                                  977/773

FOREIGN PATENT DOCUMENTS

| KR | 1020140082571 A | 7/2014 |
|---|---|---|
| KR | 101855848 B1 | 5/2018 |
| KR | 1020190033214 A | 3/2019 |

OTHER PUBLICATIONS

Xiao et al., "Scalable salt-templated synthesis of two-dimensional transition metal oxides", Nature Communications, 2016, 32 pages, vol. 7:11296.

* cited by examiner

*Primary Examiner* — Eli S Mekhlin
(74) *Attorney, Agent, or Firm* — The Webb Law Firm

(57) ABSTRACT

Provided are a negative electrode active material including a three-dimensional composite. The three-dimensional composite includes secondary particles containing a silicon carbide-based (SiCx, 0<x≤1) nanosheet having a bent portion and amorphous carbon. Also provided are a method of producing the same, and a negative electrode and a lithium secondary battery including the negative electrode active material.

12 Claims, 5 Drawing Sheets

COMPOSITE NEGATIVE ELECTRODE ACTIVE MATERIAL, METHOD OF PRODUCING THE SAME, AND NEGATIVE ELECTRODE AND LITHIUM SECONDARY BATTERY INCLUDING THE SAME

CROSS-REFERENCE TO RELATED APPLICATION

This application claims priority to Korean Patent Application No. 10-2020-0105117 filed Aug. 21, 2020, the disclosure of which is hereby incorporated by reference in its entirety.

BACKGROUND OF THE INVENTION

Field of the Invention

The following disclosure relates to a negative electrode active material, a method of producing the same, and a negative electrode and a lithium secondary battery including the same, and more particularly, to a material having a higher capacity than a conventional commercialized carbon-based negative electrode active material and, in particular, having a high capacity and a high charge and discharge efficiency characteristic, and a method of producing the same.

Description of Related Art

A lithium secondary battery is a battery which is charged and discharged with an exchange of lithium ions using an oxidation/reduction reaction between a negative electrode and a positive electrode, and is composed of an electrolyte solution, a positive electrode, a negative electrode, and a separator.

In order to apply the lithium secondary battery as such as an energy storage medium to keep up with a soaring electric vehicle market demand, it is necessary to dramatically increase a charge and discharge output characteristic for rapid energy supply as well as to increase the capacity of the negative electrode active material.

However, a conventional carbon-based negative electrode active material has a theoretical capacity of only 372 mAh/g, and due to a relatively slow carbon interlayer insertion and desorption mechanism of lithium ions during charge and discharge, in particular, the output characteristic thereof in the fast charge is significantly poor. In order to solve the problem, a material which is not a conventional carbon-based negative electrode material but an alloy-based material having a high capacity and undergoing an alloying reaction with lithium ions during charge has been researched and developed.

However, since the alloy-based material has a significantly low electrical conductivity and significantly expands in volume during charge, serious electrode plate damage is caused, which results in a rapid decrease in a battery capacity.

Related Art Document 1 has a technical feature of heat-treating a mixture of clay and an alkaline earth metal to reduce silica contained in the clay to a silicon nanosheet, for minimizing a volume change during charge/discharge simultaneously with applying silicon having a high theoretical capacity to a lithium secondary battery, but it is difficult to uniformly produce a silicon nanosheet in that a mixture including clay and an alkaline earth metal is used and etching is performed using an acidic solution after the heat treatment, and it is substantially difficult to apply this to a negative electrode active material. In addition, when only the silicon nanosheet is used as a negative electrode active material, it is difficult to adjust a volume change during charge/discharge to a sufficient level.

Related Art Document 2 has a technical feature of mixing a silicon-based material and a carbon-based material to produce a negative electrode active material for suppressing expansion of a silicon-based negative electrode active material during charge/discharge of a lithium secondary battery, but since a silicon-based material is included in a small amount of about 10 wt % with respect to the total weight of a negative electrode active material, a capacity characteristic of the negative electrode active material is not good, and it is difficult to adjust a volume change of the silicon-based material during charge/discharge to a sufficient level in that artificial graphite and natural graphite are included as a carbon-based material.

Related Art Document 3 has a technical feature of a negative electrode active material including: a coarse particle core including: primary particles including expanded graphite, silicon (Si) particles, and amorphous carbon; secondary particles including crystalline scaly graphite; and a matrix including amorphous carbon, and a negative electrode active material including an amorphous carbon surface layer on the core, for improving a charge/discharge capacity and a cycle life; however, since silicon particles are included in a small amount, a charge/discharge capacity characteristic is not sufficient, it is not easy to adjust a volume change of silicon particles during charge/discharge to a sufficient level, and since a process of producing a negative electrode active material is complicated, it is difficult to substantially apply it.

Related Art Document 1: Korean Patent Laid-Open Publication No. 10-2014-0082571

Related Art Document 2: Korean Patent Laid-Open Publication No. 10-2019-0033214

Related Art Document 3: Korean Patent Registration No. 10-1855848

SUMMARY OF THE INVENTION

An embodiment of the present invention is directed to providing a negative electrode active material which may improve performance deterioration due to volume expansion occurring during charge/discharge and a low electrical conductivity of a negative electrode active material and improve a capacity characteristic and a charge/discharge efficiency characteristic.

In one general aspect, a negative electrode active material includes a three-dimensional composite, wherein the three-dimensional composite includes secondary particles containing silicon carbide-based ($SiC_x$, $0<x\leq1$) nanosheet having a bent portion and amorphous carbon.

The silicon carbide-based nanosheet may have one to three bent portions.

50% or more of the silicon carbide-based nanosheets with respect to the total number may have one to three bent portions.

The silicon carbide-based nanosheet may have a thickness of 10 to 300 nm.

The amorphous carbon may be at least one selected from the group consisting of soft carbon, hard carbon, a mesophase pitch carbide, and calcined coke.

The three-dimensional composite may contain the silicon carbide-based nanosheet in a state of being uniformly dispersed in composite particles.

The three-dimensional composite may include the silicon carbide-based nanosheet and the amorphous carbon at a weight ratio of 5:5 to 9:1.

The three-dimensional composite may have a particle diameter of 1 to 50 μm.

In another general aspect, a method of producing a negative electrode active material includes: a chemical vapor deposition (CVD) process of coating a silicon carbide-based compound precursor on an water-soluble salt; a process of etching the water-soluble salt to prepare silicon carbide-based (SiCx, 0<x≤1) nanosheet; and a process of mixing the silicon carbide-based nanosheet and amorphous carbon to prepare a three-dimensional composite.

The silicon carbide-based compound precursor may include a silicon-based inorganic compound and an ethylene-based hydrocarbon gas.

The CVD process may be to coat the silicon carbide-based compound precursor on the water-soluble salt at a thickness of 10 to 300 nm.

In still another general aspect, a lithium secondary battery includes: a negative electrode including the negative electrode active material; a positive electrode including a positive electrode active material; a separator interposed between the negative electrode and the positive electrode; and an electrolyte solution.

Other features and aspects will be apparent from the following detailed description, the drawings, and the claims.

DESCRIPTION OF THE INVENTION

Figure 1:
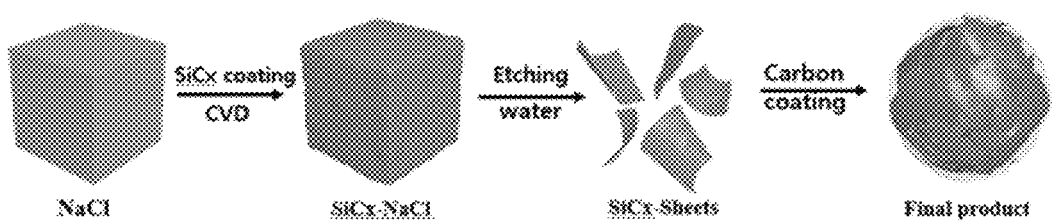
FIG. 1 is a schematic diagram of synthesizing the three-dimensional composite of the present invention.

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described in the phrase, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

A three-dimensional composite in the present specification refers to particles in which at least one secondary particle is agglomerated.

A secondary particle in the present specification refers to particles in which at least one silicon carbide-based nanosheet and amorphous carbon are agglomerated.

Hereinafter, the negative electrode active material according to an exemplary embodiment of the present invention will be described in detail.

The negative electrode active material includes a three-dimensional composite containing a silicon carbide-based (SiCx, 0<x≤1) nanosheet having a bent portion and amorphous carbon. The negative electrode active material may have a decreased volume change of a negative electrode active material during charge/discharge of a battery by introducing a nanoscale three-dimensional (3D) SiCx sheet, and may have an increased specific surface area by an interlayer insertion and desorption mechanism of lithium ions like a carbon-based material such as graphite to obtain excellent charge/discharge efficiency. In addition, the negative electrode active material may prevent SiCx from directly reacting with an electrolyte solution to produce additional by-product layers, by carbon having an excellent electrical conductivity surrounding the nanosheet, and also, may minimize stress produced by volume shrinkage/expansion occurring during a charge/discharge process to have high material stability.

The silicon carbide-based (SiCx) nanosheet may have one or more bent portions, preferably one to three bent portions. When the silicon carbide-based (SiCx) nanosheet in the three-dimensional composite of the present invention is mixed with amorphous carbon while maintaining a three-dimensional (3D) nanosheet form before preparation of the three-dimensional composite as much as possible, a volume change of the negative electrode active material during battery charge/discharge may be most effectively suppressed. When the number of the bent portions of the silicon carbide-based (SiCx) nanosheet is within the range, stress produced by volume shrinkage/expansion occurring in a charge/discharge process may be further decreased. Specifically, since the nanosheet maintains the 3D nanosheet form having a bent portion, dispersibility of the nanosheet in the three-dimensional composite may be increased and a constant distance between sheets may be maintained. Accordingly, silicon carbide-based (SiCx) active material expansion stress due to insertion/desorption of Li ions may be effectively suppressed and a mixing degree with amorphous carbon may be increased to suppress an electrolyte solution side reaction. As a result, a life and initial efficiency may be improved and a content of the nanosheet may be further increased, so that it is possible to further improve a capacity.

Meanwhile, the bent portion refers to a folded portion of the nanosheet, and as a non-limiting example, may refer to a nanosheet portion folded at an angle of 10 to 170°, preferably 20 to 170°, and more preferably 20 to 120°, and the angle of the bent portion of the nanosheet may be measured as a cross section SEM image of the three-dimensional composite. In addition, the number of the bent portions may be the average number of the nanosheet bent portions of 50% or more, preferably 60% or more, and more preferably 70% or more of the total number of the silicon nanosheets present in the three-dimensional composite, but the present invention is not limited thereto.

The silicon carbide-based (SiCx) nanosheet may have a length of 200 nm to 2 μm and a thickness of 10 to 300 nm, when the cross section of the three-dimensional composite is measured by SEM. When the length and/or the thickness of the silicon carbide-based (SiCx) nanosheet is/are within the ranges, a three-dimensional (3D) nanosheet form may be maintained well without being crushed into small particles of the nanosheet in the preparation of the three-dimensional composite, and thus, a micro-sized three-dimensional composite may be produced, which is preferred.

Specifically, the length of the silicon carbide-based (SiCx) nanosheet may be 200 nm or more and 2 μm or less, 210 nm or more and 1.5 μm or less, preferably 220 nm or more and 1 μm or less and the thickness of the silicon carbide-based (SiCx) nanosheet may be 10 nm or more and 300 nm or less, preferably 50 nm or more and 150 nm or less, more preferably 50 nm or more and 100 nm or less, and most preferably 50 nm or more and 80 nm or less. Thus, the effects described above may be further maximized.

The amorphous carbon may be at least one selected from the group consisting of soft carbon, hard carbon, a mesophase pitch carbide, and calcined coke.

The amorphous carbon has an excellent electrical conductivity and surrounds the silicon carbide-based (SiCx) nanosheet, and thus, may prevent SiCx from directly reacting with an electrolyte solution to produce additional by-product layers. In addition, the amorphous carbon may relieve stress by volume shrinkage/expansion of SiCx occurring during a charge/discharge process. In addition, the amorphous carbon may serve as a binder to suppress breakage of the three-dimensional composite particles and maintain a particle shape well. When the amorphous carbon is replaced with crystalline carbon, a stress relief effect may not be sufficient.

Meanwhile, the amorphous carbon may be prepared from a carbon precursor including sucrose, a phenol resin, a naphthalene resin, a polyvinyl alcohol resin, a furfuryl alcohol resin, a polyacrylonitrile resin, a polyamide resin, a furan resin, a cellulose resin, a styrene resin, a polyimide resin, an epoxy resin or a vinyl chloride resin, a coal-based pitch, a petroleum-based pitch, polyvinyl chloride, mesophase pitch, tar, a block copolymer, polyol, low-molecular weight heavy oil, or a mixture thereof, but is not limited thereto.

The three-dimensional composite contains the silicon carbide-based nanosheet and the amorphous carbon as described above, and may contain the silicon carbide-based nanosheet in a state of being uniformly dispersed in the particles. The state of being uniformly dispersed may refer to a state in which dispersity of the nanosheet is high so that a constant distance between the nanosheets is maintained. The silicon carbide-based nanosheet of the present invention may suppress aggregation or agglomeration inside secondary particles by one to three bent portions, so as to be present in a state of being uniformly dispersed in the three-dimensional composite.

The three-dimensional composite may contain the silicon carbide-based nanosheet and the amorphous carbon at a weight ratio of 5:5 to 9:1, for example, 5:5 to 8.5:1.5, preferably 5:5 to 7.5:2.5, and more preferably 5:5 to 6.5:3.5. In the range of weight ratio, the three-dimensional composite may have a high capacity as compared with a conventional commercialized carbon-based negative electrode material, stress due to volume expansion occurring during a charge process may be properly adjusted, and the composite may be synthesized into the 3D nanosheet form to be desired without folding the nanosheet and small grain crushing during preparation of the three-dimensional composite. When the content of the amorphous carbon relative to the silicon carbide-based nanosheet is excessively low, the amorphous carbon does not serve as a binder and it is difficult to suppress breakage of the three-dimensional composites, thereby deteriorating a battery life characteristic. In the opposite case, it may be difficult to implement a sufficient capacity. Meanwhile, since a SiCx nanosheet having a three-dimensional (3D) plate structure having a bent portion formed thereon is applied, dispersibility of the nanosheet in the three-dimensional composite particles is high so that a constant distance between sheets may be maintained, thereby further increasing the content of the nanosheet as compared with the amorphous carbon.

The three-dimensional composite may have a particle diameter of 1 to 50 μm, preferably 1 μm or more and 50 μm or less, 3 μm or more and 30 μm or less, 4 μm or more and 28 μm or less, 5 μm or more and 25 μm or less, more preferably 6 μm or more and 22 μm or less, 7 μm or more and 21 μm or less, 8 μm or more and 21 μm or less, or 10 μm or more and 21 μm or less. In the range of the particle diameter of the three-dimensional composite, a three-dimensional composite well-synthesized in a 3D nanosheet form to be desired may be prepared without folding the nanosheet and being crushed into small particles, the specific surface of the three-dimensional composite may be decreased, and an electrolyte solution is prevented from being introduced into the three-dimensional composite.

Meanwhile, the particle diameter of the three-dimensional composite may refer to an average particle diameter, specifically D50. D50 refers to a particle diameter when a cumulative percentage reaches 50 vol % and may be measured using a particle size analyzer.

The three-dimensional composite may include spherical particles, plate-shaped particles, needle-shaped particles, and/or amorphous particles, and preferably, may include spherical particles and/or elliptical particles having an aspect ratio of 1 to 2, but the present invention is not limited thereto.

Meanwhile, the spherical particles is an expression in contrast to particles having a sharp particle surface formed by crushing, does not necessarily refer to a mathematically perfect sphere, and should be understood as a concept usually embracing all levels which may be covered when individual particles at a powder level as an aggregate of particles are referred to as spherical.

Hereinafter, a method of producing a negative electrode active material according to another exemplary embodiment will be described.

The method of producing a negative electrode active material includes: a chemical vapor deposition (CVD) process of coating a silicon carbide-based compound precursor on an water-soluble salt; a process of etching the water-soluble salt to prepare a silicon carbide-based (SiCx, 0<x≤1) nanosheet; and a process of mixing the silicon carbide-based nanosheet and amorphous carbon to prepare a three-dimensional composite.

a) A silicon carbide-based compound precursor is coated on the water-soluble salt by a chemical vapor deposition (CVD) process. For example, a method of flowing a silicon carbide-based precursor gas into a furnace at a certain temperature to be vapor-deposited (CVD) on the water-soluble salt may be adopted.

The water-soluble salt is used for easy etching with distilled water and the like after CVD coating, and as a non-limiting example, amorphous sodium chloride (NaCl) having a particle size of 5 to 10 μm is preferred. Thus, a silicon carbide-based nanosheet of a 3D shape having a bent portion may be prepared well.

The silicon carbide-based compound precursor may include both a silicon-based inorganic compound and an ethylene-based hydrocarbon gas. As a non-limiting example, the silicon-based inorganic compound may be silane ($SiH_4$) and the ethylene-based hydrocarbon gas may be ethylene ($C_2H_4$). $SiH_4$ is an inorganic compound used as a precursor of silicon and is colorless ignitable gas having an odor like acetic acid, and $C_2H_4$ is ethylene-based hydrocarbon which is appropriate for use in carbon coating on the negative electrode active material by vapor deposition.

The CVD process may be to coat the silicon carbide-based compound precursor on the water-soluble salt at a thickness of 10 to 300 nm. Thus, a silicon carbide-based nanosheet of a 3D shape having a bent portion may be prepared well without being crushed into small particles.

Coating of the silicon carbide-based compound using the CVD process may be performed at a temperature of 300 to 800° C., at a flow rate of 600 to 1400 sccm of $SiH_4$ and 200 to 600 sccm of $C_2H_4$ for 0.5 to 1.5 hours/NaCl-1 kg. Thus, a silicon carbide-based nanosheet of a 3D shape having a bent portion may be prepared well.

b) The water-soluble salt is etched to prepare a silicon carbide-based (SiCx) nanosheet. The etching process may be etching by dissolving the water-soluble salt in water, and specifically, 0.5 to 3 kg of an water-soluble salt on which the silicon carbide-based material prepared is coated is added to 2 to 10 L of deionized (DI) water, distilled water, or the like. Subsequently, the water-soluble salt may be etched with stirring at 100 to 50000 rpm at room temperature for 4 to 24 hours to prepare the silicon carbide-based (SiCx) nanosheet. However, the present invention is not limited thereto.

c) The silicon carbide-based (SiCx) nanosheet prepared and amorphous carbon are mixed and spheroidized to prepare a three-dimensional composite.

As spheroidization, a spheroidization process commonly known in the art may be applied, and as a non-limiting example, the silicon carbide-based nanosheet and the amorphous carbon are mixed at a weight ratio of 5:5 to 9:1 and stirred at 2000 to 4000 rpm for 5 to 30 min. Subsequently, a heat treatment is performed by a condition of raising the temperature from room temperature (25° C.) at a heating rate of 1 to 5° C./min, maintaining the temperature at 250 to 400° C. for 1 to 5 hours, raising the temperature at a heating rate of 1 to 5° C./min, and maintaining the temperature at 820 to 1020° C. for 1 to 3 hours to prepare a composite. Subsequently, the prepared composite may be washed and dried to prepare the three-dimensional composite according to an exemplary embodiment of the present invention.

The washing solution used in washing is not particularly limited, but for example, it is preferred to use tetrahydrofuran (THF) and/or acetone. Specifically, the composite may be washed for 0.5 to 1 hour using an appropriate amount of THF and acetone, and a washing method known in the art may be applied. In addition, the drying process may be performed for 5 to 15 hours, preferably 8 to 15 hours in an oven at 10 to 50° C., and preferably 30 to 50° C., and a drying method known in the art may be applied.

Another exemplary embodiment of the present invention provides a negative electrode for a lithium secondary battery including: a current collector; and the negative electrode active material positioned on the current collector.

The current collector may be selected from the group consisting of a copper foil, a nickel foil, a stainless steel foil, a titanium foil, a nickel foam, a copper foam, a polymer substrate coated with a conductive metal, and a combination thereof, but is not limited thereto.

The negative electrode active material layer includes a negative electrode active material, and optionally, may further include a binder and a conductive material.

As the negative electrode active material, optionally, a material including the three-dimensional composite and being capable of reversibly intercalating/deintercalating lithium ions, a lithium metal, an alloy of lithium metal, a material capable of being doped and de-doped in lithium, or a transition metal oxide may be further included.

The three-dimensional composite is as described above.

Examples of the material which may reversibly intercalate/deintercalate the lithium ions include a carbon material, that is, a carbon-based negative electrode active material, which is commonly used in the lithium secondary battery. Representative examples of the carbon-based negative electrode active material include crystalline carbon, amorphous carbon, or a combination thereof. Examples of the crystalline carbon include graphite such as amorphous, plate-shaped, flake-shaped, spherical, or fibrous natural graphite or artificial graphite, and examples of the amorphous carbon include soft carbon or hard carbon, a mesophase pitch carbide, calcined coke, and the like.

The alloy of the lithium metal may be an alloy of lithium with a metal selected from the group consisting of Na, K, Rb, Cs, Fr, Be, Mg, Ca, Sr, Si, Sb, Pb, In, Zn, Ba, Ra, Ge, Al, and Sn.

The material which may be doped and de-doped in lithium may be a silicon-based material, for example, Si, $SiO_x$ ($0<x<2$), a Si-Q alloy (Q is an element selected from the group consisting of alkali metals, alkali earth metals, Group 13 elements, Group elements, Group 15 elements, Group 16 elements, transition metals, rare-earth elements, and combinations thereof, and is not Si), a Si-carbon composite, Sn, $SnO_2$, a Sn—R alloy (R is an element selected from the group consisting of alkali metals, alkali earth metals, Group 13 elements, Group 14 elements, Group elements, Group 16 elements, transition metals, rare-earth elements, and combinations thereof, but is not Sn), a Sn-carbon composite, and the like, and also, a mixture of at least one thereof and $SiO_2$ may be used. The elements Q and R may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may be a lithium titanium oxide.

In the negative electrode active material, the content of the three-dimensional composite may be 1 to 100 wt %, 10 to 100 wt %, 50 to 100 wt %, or 80 to 100 wt %, and most preferably 100 wt % with respect to the total weight of the negative electrode active material.

The binder serves to adhere negative electrode active material particles to each other and to attach the negative electrode active material to the current collector well. The binder is not particularly limited as long as it is used as a negative electrode binder in the art, and for example, a non-aqueous binder, an aqueous binder, or a combination thereof may be used.

The conductive material is used for imparting conductivity to an electrode and any conductive material may be used as long as it is an electroconductive material without causing a chemical change in the battery to be configured. As the examples of the conductive material, a conductive material including carbon-based materials such as natural graphite, artificial graphite, carbon black, acetylene black, ketjen black, and carbon fiber; metal-based materials such as metal powder or metal fiber of copper, nickel, aluminum, silver, and the like; conductive polymers such as a polyphenylene derivative; or a mixture thereof may be used.

Each of the contents of the binder and the conductive material in the negative electrode active material layer may be 1 to 10 wt %, preferably 1 to 5 wt % with respect to the total weight of the negative electrode active material layer, but is not limited thereto.

Another exemplary embodiment provides a lithium secondary battery including: the negative electrode; a positive electrode; a separator; and an electrolyte solution.

The negative electrode is as described above.

The positive electrode includes a current collector and a positive electrode active material layer formed by applying a positive electrode slurry including a positive electrode active material on the current collector.

The current collector may be a negative electrode current collector described above, or any known material in the art may be used, but the present invention is not limited thereto.

The positive electrode active material layer includes a positive electrode active material, and optionally, may further include a binder and a conductive material. The positive electrode active material may be any positive electrode active material known in the art, and for example, it is preferred to use a composite oxide of lithium with a metal selected from cobalt, manganese, nickel, and a combination thereof, but the present invention is not limited thereto.

The binder and the conductive material may be a negative electrode binder and a negative electrode conductive material described above, and any material known in the art may be used, but the present invention is not limited thereto.

The separator may be selected from glass fiber, polyester, polyethylene, polypropylene, polytetrafluoroethylene, or a combination thereof, and may be in the form of nonwoven or woven fabric. For example, in the lithium secondary battery, a polyolefin-based polymer separator such as polyethylene or polypropylene may be mainly used, a separator coated with a composition including a ceramic component or a polymer material for securing thermal resistance or mechanical strength may be used, optionally, a single layer or a multilayer structure may be used, and any separator known in the art may be used, but the present invention is not limited thereto.

The electrolyte solution includes an organic solvent and a lithium salt.

The organic solvent serves as a medium in which ions involved in the electrochemical reaction of the battery may move, and for example, carbonate-based, ester-based, ether-based, ketone-based, alcohol-based, or aprotic solvents may be used, the organic solvent may be used alone or in combination of two or more, and when used in combination of two or more, a mixing ratio may be appropriately adjusted depending on battery performance to be desired. Meanwhile, any organic solvent known in the art may be used, but the present invention is not limited thereto.

The lithium salt is dissolved in the organic solvent and acts as a source of the lithium ion in the battery to allow basic operation of the lithium secondary battery, and is a material which promotes movement of lithium ions between a positive electrode and a negative electrode. Examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+4}SO_2)$ (x and y are natural numbers), LiCl, LiI, $LiB(C_2O_4)_2$, or a combination thereof, but the present invention is not limited thereto.

A concentration of the lithium salt may be in a range of 0.1 M to 2.0 M. When the lithium salt concentration is within the range, the electrolyte solution has appropriate conductivity and viscosity to show excellent electrolyte performance and lithium ions may effectively move.

In addition, the electrolyte solution may further include pyridine, triethyl phosphate, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, and the like, if necessary, for improving charge and discharge characteristics, flame retardant characteristics, and the like. In some cases, a halogen-containing solvent such as carbon tetrachloride and ethylene trifluoride may be further included for imparting non-flammability, and fluoro-ethylene carbonate (FEC), propene sultone (PRS), fluoro-propylene carbonate (FPC), and the like may be further included for improving conservation properties at a high temperature.

The method of producing a lithium secondary battery according to the present invention for achieving the above object may include laminating the produced negative electrode, separator, and positive electrode in this order to form an electrode assembly, placing the produced electrode assembly in a cylindrical battery case or an angled battery case, and then injecting an electrolyte solution. Otherwise, the lithium secondary battery may be produced by laminating the electrode assembly and immersing the assembly in the electrolyte solution to obtain a resultant product which is then placed in a battery case and sealed.

As the battery case used in the present invention, those commonly used in the art may be adopted, there is no limitation in appearance depending on the battery use, and for example, a cylindrical shape, an angled shape, a pouch shape, a coin shape, or the like using a can may be used.

The lithium secondary battery according to the present invention may be used in a battery cell used as a power supply of a small device, and also may be preferably used as a unit cell in a medium or large battery module including a plurality of battery cells. Preferred examples of the medium or large device include an electric automobile, a hybrid electric automobile, a plug-in hybrid electric automobile, a system for power storage, and the like, but are not limited thereto.

Hereinafter, the preferred Examples and Comparative Examples of the present invention will be described. However, the following Examples are only a preferred exemplary embodiment of the present invention, and the present invention is not limited thereto.

EXAMPLES

Example 1

Each of $SiH_4$ and $C_2H_4$ was coated on sodium chloride 500 to 3000 sccm:100 to 1500 sccm by a CVD process (per 1 kg of NaCl) at 400 to 700° C. for 1 to 5 hours. Thereafter, the obtained SiCx-NaCl material was added to 5 L of D.I. at room temperature and stirred to obtain a SiCx nanosheet of a 3D shape having a bent portion. The SiCx nanosheet of a 3D shape prepared and amorphous carbon (coal tar pitch) were mixed at a weight ratio of 8:2, added to a particle granulator (Nobilta, Hosokawa micron corporation), and stirred at 2700 to 3500 rpm for 5 to 15 min. The temperature was raised from room temperature (25° C.) at a heating rate of 1 to 4° C./min and maintained at 255 to 395° C. for 1.5 to 3.5 hours. Subsequently, the temperature was raised at a heating rate of 1 to 4° C./min and maintained at 860 to 1020° C. for 1.5 to 3 hours to synthesize a carbon/SiCx composite negative electrode active material.

The thus-prepared negative electrode active material, a binder (SBR:CMC=1:1 (weight ratio)), and a conductive material (carbon black) were mixed at a weight ratio of 96:2:2, and then were dispersed in water to prepare a negative electrode slurry.

The prepared negative electrode slurry was coated on a copper thin film, dried in an oven at 80° C. for about 2 hours, rolled at a pressure of 3.8 MPa, and further dried for 12 hours in a vacuum oven at 110° C. to produce a negative electrode.

The thus-produced negative electrode, a positive electrode, and an electrolyte solution were used and a commonly known production process were applied to produce a CR2016 coin type lithium secondary battery.

Here, as the positive electrode, a positive electrode including a nickel-cobalt-manganese (NCM622)-based active material was used, and as the electrolyte solution, a solution including 1 M $LiPF_6$ (EC/EMC/DEC at a volume ratio of 1/1/1) was used.

EVALUATION EXAMPLES

[Evaluation Example 1]: Scanning Electron Microscopy (SEM) Analysis of Silicon Carbide-Based Nanosheet and Composite Negative Electrode Active Material

Comparative Example 1

A carbon/Si (nanosheet) three-dimensional composite negative electrode active material was synthesized in the same manner as in Example 1, except that micro-sized silicon (Si) particles were produced into a nanosheet (thickness: <20 nm, diameter: <300 nm) of a 2D shape by a wet ball mill grinding method and the thus-prepared silicon nanosheet and amorphous carbon were mixed at a weight ratio of 7:3, and a negative electrode and a secondary battery were produced.

SEM images of the silicon carbide-based nanosheet (FIGS. 2A and 2B) of Example 1, and an SEM image of the three-dimensional composite (FIG. 3A) and cross section SEM images of the three-dimensional composite (FIGS. 3B and 3C) prepared in Example 1 were measured, and an SEM image of the three-dimensional composite (FIG. 4A) and cross section SEM images of the three-dimensional composite (FIGS. 4B and 4C) prepared in Comparative Example 1 were measured.

Figure 2A:
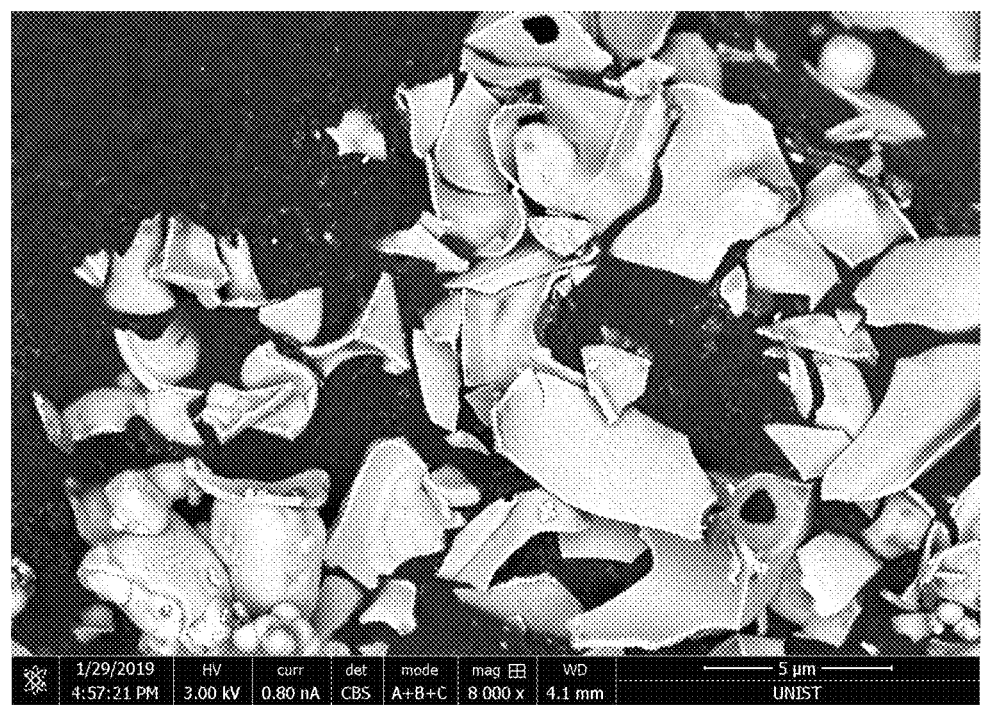
FIGS. 2A and 2B are SEM images of silicon carbide-based nanosheets prepared in Example 1.
Figure 2B:
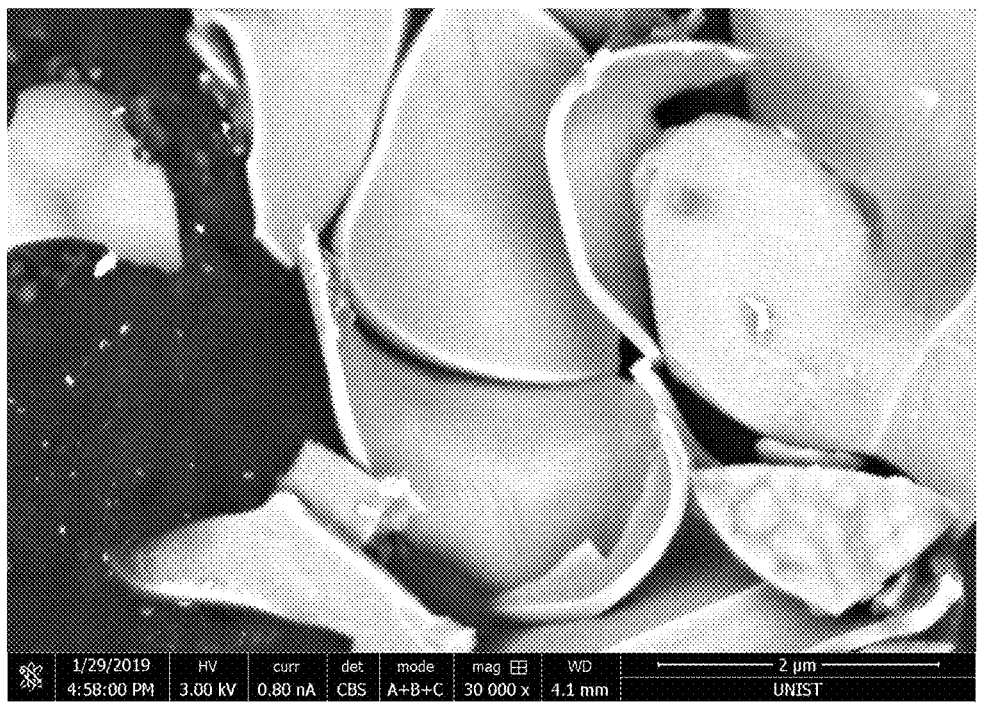

It was confirmed in FIGS. 2A and 2B that a nanosheet of a 3D shape having a bent portion was synthesized in Example 1.

Figure 3A:
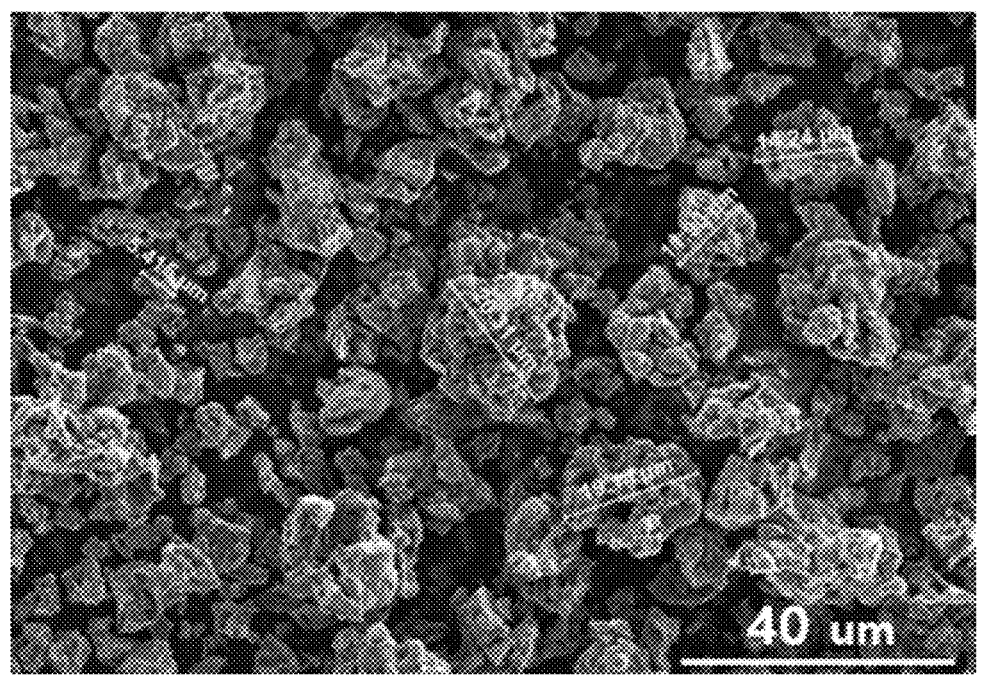
FIG. 3A is an SEM image of a three-dimensional composite prepared in Example 1 and FIGS. 3B and 3C are cross section SEM images of the three-dimensional composite prepared in Example 1.
Figure 3B:
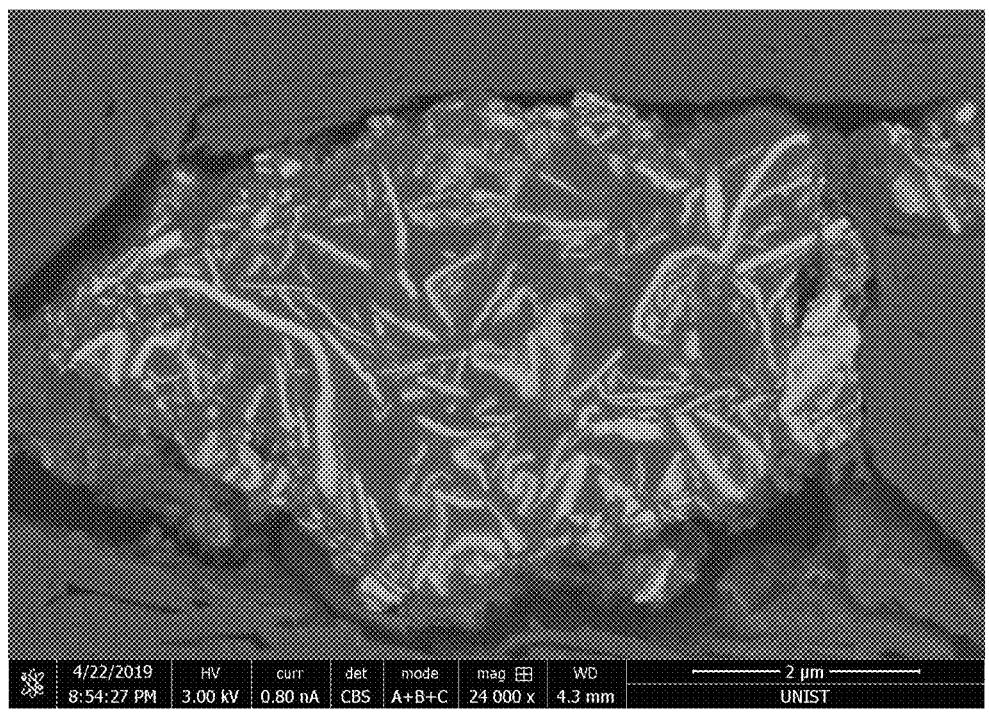
Figure 3C:
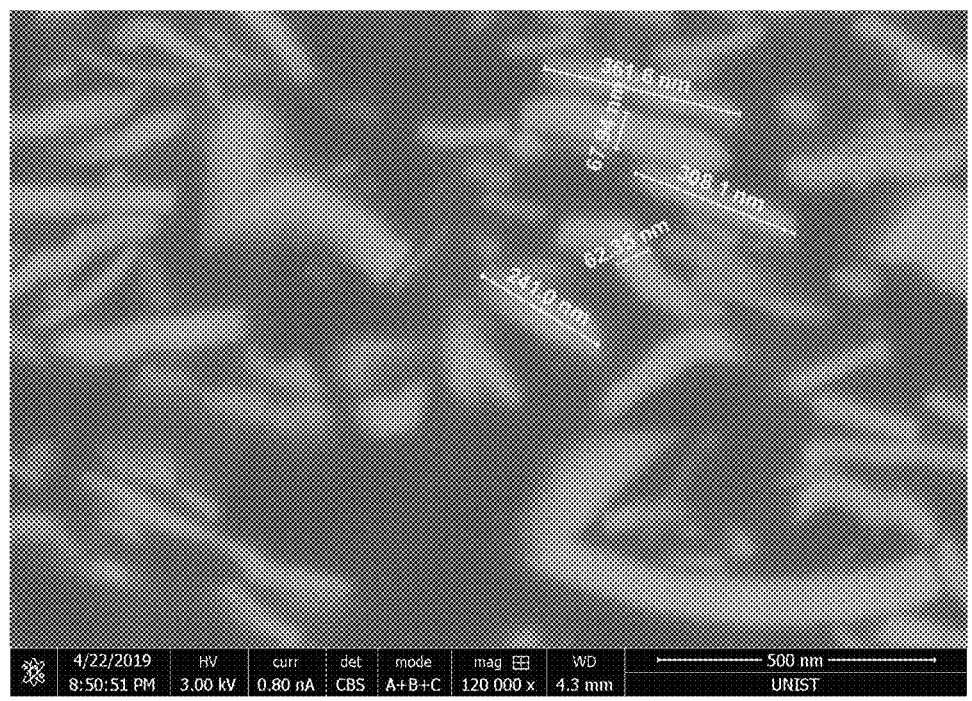
Figure 4A:
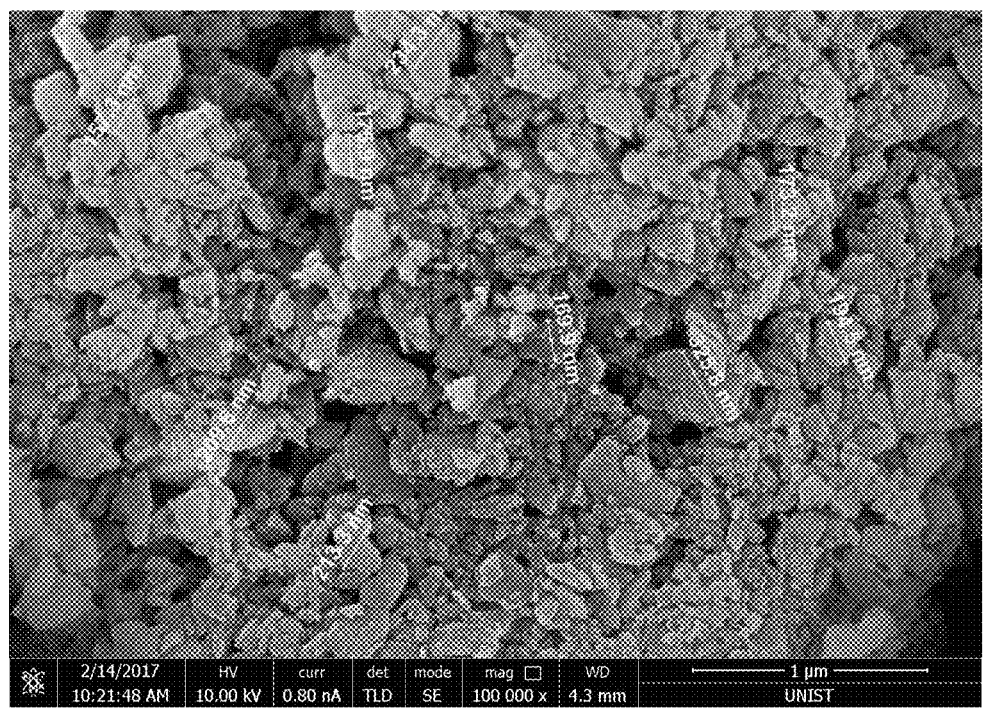
FIG. 4A is an SEM image of a three-dimensional composite prepared in Comparative Example 1 and FIGS. 4B and 4C are cross section SEM images of the three-dimensional composite prepared in Comparative Example 1.
Figure 4B:
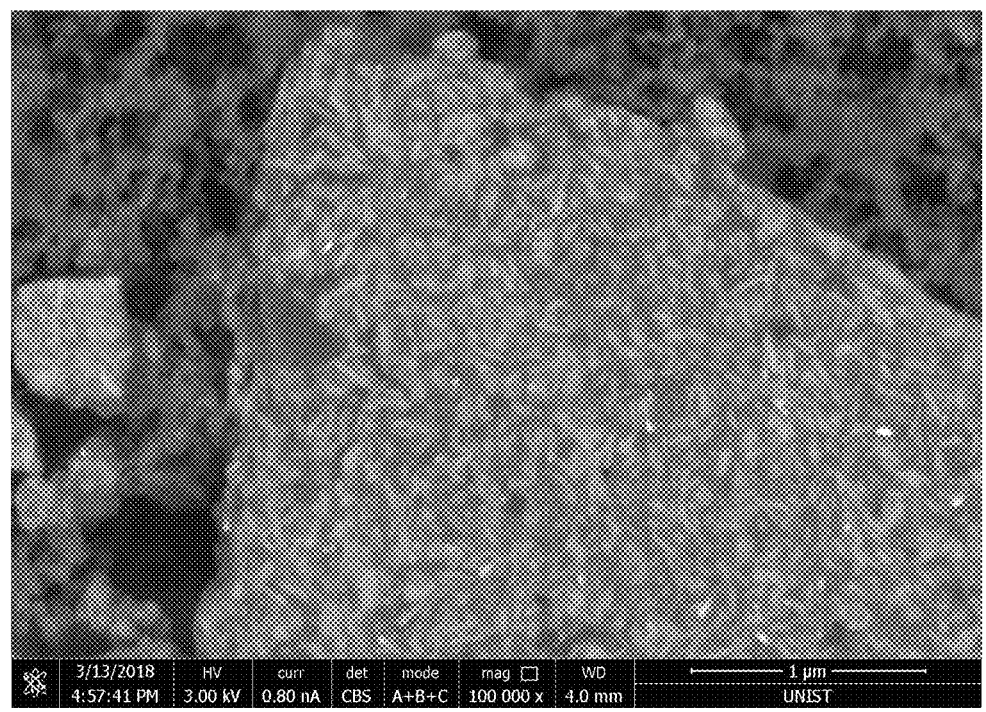
Figure 4C:
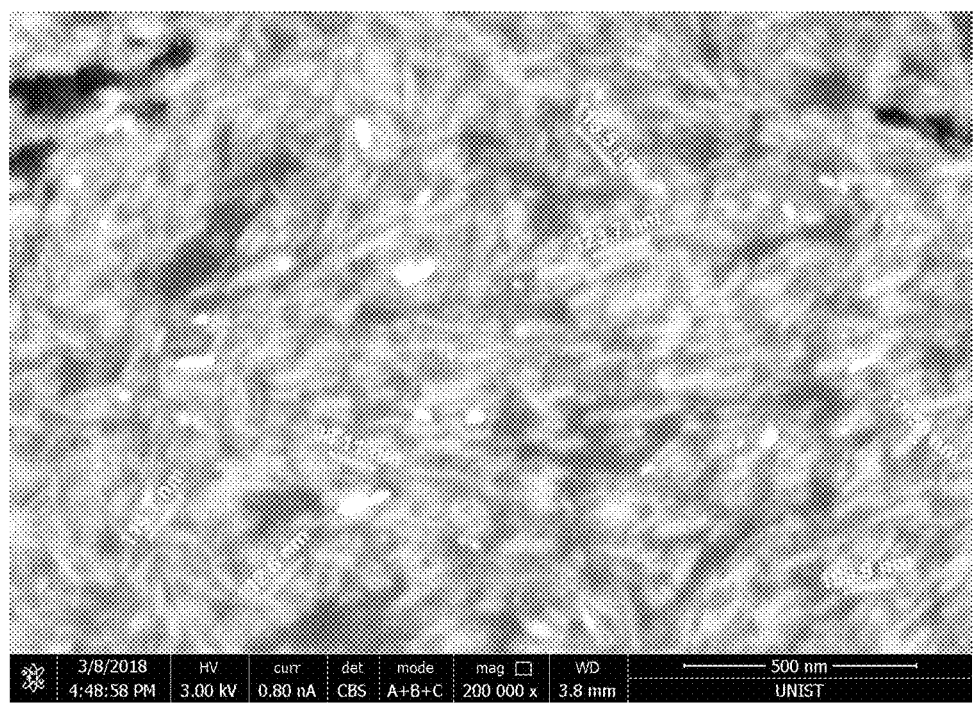

Comparing composite particles of FIGS. 3A and 4A, Example of the present invention was synthesized well into a micro-sized composite having a spherical shape, but in Comparative Example 1, as confirmed in FIGS. 4B and 4C below, the nanosheet was not dispersed well so that it was difficult to prepare the three-dimensional composite and the composite particles prepared did not have a micro size but were crushed into nano-sized irregular amorphous small particles.

Comparing the cross sections of the composite particles in FIGS. 3B and 3C and FIGS. 4B and 4C, it was confirmed that a distance between plate-shaped silicon carbide-based nanosheets in Example 1 was large as compared with Comparative Example 1, and thus, the nanosheet was well dispersed inside the three-dimensional composite particles without aggregating.

[Evaluation Example 2]: Evaluation of Battery Performance

Example 2

A negative electrode and a secondary battery were produced in the same manner as in Example 1, except that the SiCx nanosheet of a 3D shape prepared and amorphous carbon (coal tar pitch) were mixed at a weight ratio of 7:3 to synthesize a carbon/SiCx composite negative electrode active material.

Comparative Example 2

A carbon/Si (particle) three-dimensional composite negative electrode active material, a negative electrode, and a lithium secondary battery were produced in the same manner as in Example 1, except that silicon particles (Si, D50: 30 to 50 nm) were used instead of a SiCx nanosheet.

Comparative Example 3

A negative electrode and a lithium secondary battery were produced in the same manner as in Example 1, except that silicon particles (Si, D50: 30 to 50 nm) were used as the negative electrode active material instead of the carbon/SiCx composite.

(Evaluation Method)

Evaluation of Initial Discharge Capacity and Initial Efficiency

A constant current was applied to a battery at a current of a 0.1 C rate at 25° C. until a battery voltage reached 0.01 V (vs. Li), and when the battery voltage reached 0.01 V, a constant voltage was applied until the current reached a 0.01 C rate to perform charge. During discharge, discharge was performed at a constant current at a 0.1 C rate until the voltage reached 1.5 V (vs. Li).

Evaluation of Room Temperature Cycle Life

A constant current was applied to a battery at a current of a 0.5 C rate at 25° C. until a battery voltage reached 0.01 V (vs. Li) to perform charge, and when the battery voltage reached 0.01 V (vs. Li), a constant voltage was applied until the current reached a 0.01 C rate to perform charge. During discharge, a cycle of discharging at a constant current of 0.5 C rate until the voltage reached 1.5 V was repeated 50 times. After 50 cycles, a discharge capacity with respect to an initial discharge capacity was calculated.

An initial discharge capacity, initial efficiency, and a room temperature cycle life of Examples 1 and 2 and Comparative Example 2 and 3 were measured, and the results are shown in Table 1.

TABLE 1

|  | Initial discharge capacity (mAh/g) | Initial efficiency (%) | Capacity retention rate (50 cycles, %) |
|---|---|---|---|
| Example 1 | 2,346 | 91.3 | 75.1 |
| Example 2 | 1,902 | 91.7 | 83.9 |
| Comparative Example 2 | 3,427 | 85.5 | 60.1 |
| Comparative Example 3 | 3,533 | 62.6 | 14.2 |

Referring to Table 1, the initial discharge capacity of Examples 1 and 2 was somewhat lower than that of Comparative Examples 2 and 3, but the initial efficiency and the capacity retention rate of Examples 1 and 2 were significantly improved, which suggests that performance was stably maintained even during battery operation.

Meanwhile, it was confirmed that since the content of the SiCx nanosheet was increased in Example 1, the initial discharge capacity was increased by 400 mAh/g or more as compared with Example 2, but the initial efficiency and the capacity retention rate were decreased to a relatively small extent.

[Evaluation Example 3]: Evaluation of Battery Performance

Example 3

A carbon/SiCx composite negative electrode active material was synthesized and a negative electrode and a secondary battery were produced in the same manner as in Example 1, except that the SiCx nanosheet and amorphous carbon were mixed at a weight ratio of 6:4.

Example 4

A carbon/SiCx composite negative electrode active material was synthesized and a negative electrode and a secondary battery were produced in the same manner as in Example 1, except that the SiCx nanosheet and amorphous carbon were mixed at a weight ratio of 5:5.

Comparative Example 4

A carbon/Si (nanosheet) composite negative electrode active material was synthesized and a negative electrode and a secondary battery were produced in the same manner as in Comparative Example 1, except that the Si nanosheet and amorphous carbon were mixed at a weight ratio of 6:4.

(Evaluation Method)
Evaluation of Room Temperature Cycle Life

Capacity evaluation for the lithium secondary batteries of Examples 1 to 4 and Comparative Examples 1 and 4 was performed in the same manner as the evaluation of room temperature cycle life of Evaluation Example 2, and the results are shown in the following Table 2:

TABLE 2

|  | SiCx: amorphous carbon (weight ratio) | Capacity retention rate (50 cycles, %) |
|---|---|---|
| Example 1 | 8:2 | 75.1 |
| Example 2 | 7:3 | 83.9 |
| Example 3 | 6:4 | 88.6 |
| Example 4 | 5:5 | 84.1 |
| Comparative Example 1 | 7:3 (Si: amorphous carbon) | 55.1 |
| Comparative Example 4 | 6:4 (Si: amorphous carbon) | 63.2 |

Referring to Table 2, in Examples 1 to 4 of the present invention, the SiCx nanosheet having a 3D plate-shaped structure having a bent portion formed thereon was applied, and thus, dispersity of the nanosheet in the three-dimensional composite was high to maintain a constant distance between sheets, thereby further increasing the content of the nanosheet with respect to the amorphous carbon. However, since the nanosheets of Comparative Examples 1 and 4 had a 2D plate-shaped structure having no bent portion, it suggests that it is difficult to relieve volume expansion of silicon during battery operation, and a higher content of amorphous carbon is needed for having the same level of capacity retention rate and capacity loss occurs to the extent.

Meanwhile, in the present invention, it was confirmed that as the content of SiCx in the three-dimensional composite is increased, the capacity characteristic was improved, but when the content is higher than the preferred range, the capacity retention rate was rapidly decreased.

The technology suggested herein allows a silicon carbide-based nanosheet to be produced by a simple etching process using water-soluble single crystal grains, thereby dispensing with a milling process to prevent surface oxidation occurring during a milling process of silicon carbide, and since the aqueous single crystal grains may be easily removed by etching even in water, so that a simple process may be applied as compared with an etching process using a sodium hydroxide (NaOH) solution, hydrofluoric acid (HF), and the like.

In addition, the negative electrode active material of the technology suggested herein may prevent SiCx from directly reacting with an electrolyte solution to produce additional by-product layers, by carbon having an excellent electrical conductivity surrounding a nanoscale SiCx layer. In addition, stress produced by volume expansion occurring during a charge process is minimized so that material stability may be high. In addition, since SiCx is included, the capacity may be high as compared with a conventional commercialized carbon-based negative electrode material and an excellent charge/discharge efficiency characteristic may be implemented.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

What is claimed is:
1. A negative electrode active material comprising a three-dimensional composite,
wherein the three-dimensional composite comprises secondary particles containing a silicon carbide-based nanosheet having a bent portion and amorphous carbon, the silicon carbide-based is represented by SiCx, and $0<x\leq1$.

2. The negative electrode active material of claim 1, wherein the silicon carbide-based nanosheet has one to three bent portions.

3. The negative electrode active material of claim 1, wherein 50% or more of the silicon carbide-based nanosheets with respect to the total number has one to three bent portions.

4. The negative electrode active material of claim 1, wherein the silicon carbide-based nanosheet has a thickness of 10 to 300 nm.

5. The negative electrode active material of claim 1, wherein the amorphous carbon is at least one selected from the group consisting of soft carbon, hard carbon, a mesophase pitch carbide, and calcined coke.

6. The negative electrode active material of claim 1, wherein the three-dimensional composite contains the silicon carbide-based nanosheet in a state of being uniformly dispersed in the composite particles.

7. The negative electrode active material of claim 1, wherein the three-dimensional composite contains the silicon carbide-based nanosheet and the amorphous carbon at a weight ratio of 5:5 to 9:1.

8. The negative electrode active material of claim 1, wherein the three-dimensional composite has a particle diameter of 1 to 50 μm.

9. A method of producing the negative electrode active material of claim 1, the method comprising:

a chemical vapor deposition process of coating a silicon carbide-based compound precursor on an water-soluble salt;

a process of etching the water-soluble salt to prepare a silicon carbide-based nanosheet; and a process of mixing the silicon carbide-based nanosheet and amorphous carbon to prepare a three-dimensional composite, wherein the silicon carbide-based is represented by $SiC_x$, and $0<x\leq 1$.

10. The method of producing a negative electrode active material of claim 9, wherein the silicon carbide-based compound precursor comprises a silicon-based inorganic compound and an ethylene-based hydrocarbon gas.

11. The method of producing a negative electrode active material of claim 9, wherein the chemical vapor deposition process is to coat the silicon carbide-based compound precursor on the water-soluble salt at a thickness of 10 to 300 nm.

12. A lithium secondary battery comprising: a negative electrode comprising the negative electrode active material of claim 1; a positive electrode comprising a positive electrode active material; a separator interposed between the negative electrode and the positive electrode; and an electrolyte solution.

* * * * *